Fig 1

Dec. 27, 1932.  C. T. RAULE  1,892,363
MULTIPLE EXTERNAL GRINDER
Filed Sept. 21, 1926   8 Sheets-Sheet 2

Fig 2

INVENTOR.
Clifford T. Raule
BY
ATTORNEY.

Dec. 27, 1932.    C. T. RAULE    1,892,363
MULTIPLE EXTERNAL GRINDER
Filed Sept. 21, 1926    8 Sheets-Sheet 3

INVENTOR.
Clifford T. Raule
BY
ATTORNEY.

Dec. 27, 1932.  C. T. RAULE  1,892,363
MULTIPLE EXTERNAL GRINDER
Filed Sept. 21, 1926   8 Sheets-Sheet 5

INVENTOR.
Clifford T. Raule.
BY
ATTORNEY.

Dec. 27, 1932.                C. T. RAULE                1,892,363
                        MULTIPLE EXTERNAL GRINDER
                    Filed Sept. 21, 1926     8 Sheets-Sheet 6

INVENTOR.
Clifford T. Raule
BY
ATTORNEY.

Fig 12

Dec. 27, 1932.  C. T. RAULE  1,892,363
MULTIPLE EXTERNAL GRINDER
Filed Sept. 21, 1926  8 Sheets-Sheet 8

INVENTOR.
Clifford T. Raule
BY
ATTORNEY.

Patented Dec. 27, 1932

1,892,363

UNITED STATES PATENT OFFICE

CLIFFORD T. RAULE, OF BROOKLINE, PENNSYLVANIA

MULTIPLE EXTERNAL GRINDER

Application filed September 21, 1926. Serial No. 136,771.

My invention relates to external grinders intended for grinding a large quantity of like articles.

A purpose of my invention is to obtain quantity production of precision externally ground duplicate parts, whether the ground surfaces are to be straight, tapered or curved.

A further purpose is to guide interchangeable planetary work-holders in the same orbit around a common grinding wheel or wheels preferably by means common to all.

A further purpose is to control the feed between planetary work-holders and a common grinding wheel around which the holders circle by means common to the workholders, preferably using common means to relatively reciprocate the work and wheel.

A further purpose is to load and unload a multiple external grinder automatically.

A further purpose is to adapt a multiple grinder with a common wheel to centered and centerless grinding at the option of the designer.

A further purpose is to angularly synchronize the progressive grinding operations of a central grinding wheel upon work pieces simultaneously applied to the wheel by a number of planetary work-holders, automatically controlling the successive operations.

A further purpose is to complete the grinding of simultaneously ground bodily moving work pieces during a definite portion of the orbit of each piece.

A further purpose is to actuate loading and unloading mechanisms of centered or centerless type at the same points respectively in the path of the travel of a plurality of bodily movable work-holders cooperating with the same wheel preferably using a gravity feed.

A further purpose is to operate a plurality of bodily movable work-holders cooperating respectively with the same different grinding surfaces to grind with one surface and to finish with another surface at the same or different speeds, making the change automatically.

A further purpose is in external grinding to change the speed of the work for finish grinding.

A further purpose is to apply an automatic gravity feed to a multiple external grinder.

A further purpose is to apply a multiple external grinder to simultaneously grind different work pieces to different definite sizes.

A further purpose is to removably mount diamonding mechanism upon the feed cam to a multiple external grinder.

My invention relates both to the methods of grinding and to apparatus by which the methods may be carried out.

Further purposes will appear in the specification and in the claims.

I prefer to illustrate my invention by a few only of many forms in which it may be carried out, selecting forms for their illustrative value chiefly, to disclose to the best advantage the principles of my invention.

All of the figures are viewed by me as diagrammatic to the extent at least that I have selected the simple outlines of parts capable of carrying out the functions described, rather than more complex and finished illustrations such as would represent the best designs for accomplishing the results.

The present invention deals with external grinding and has been illustrated with a view to showing that it is capable of all around work, i. e. can be used for centered grinding, with one live drawing center or separate work driving, using mandrels for hollow work. It is also suited for centerless grinding. It is applied to straight or tapered work, driving the work in the direction of or against the direction of the rotation of the grinding wheel and with finished grinding or polishing upon a separate surface or at a separate speed as desired.

Individual grinders for quantity production of duplicate parts are usually designed to handle the particular work upon which they are to operate; and in the adaptation of the present grinder to its work the same holds true, the various features above being selected or omitted according to the need of the particular work or to the preference of the individual designer.

The novel features shown are valuable in any one of the many uses suggested but also make the invention flexible, adapting it to all of the different features recited.

I recognize that there are many forms by which the elemental and more detailed features of my invention can be carried out, that these need not be wholly mechanical and that the selection of a particular mechanism by which my invention is carried out will differ greatly according to the character of work to be handled and the preference and previous experience of the designer.

Describing thus in explanation of the rather diagrammatic illustrations shown and not in limitation:—

Figure 1:
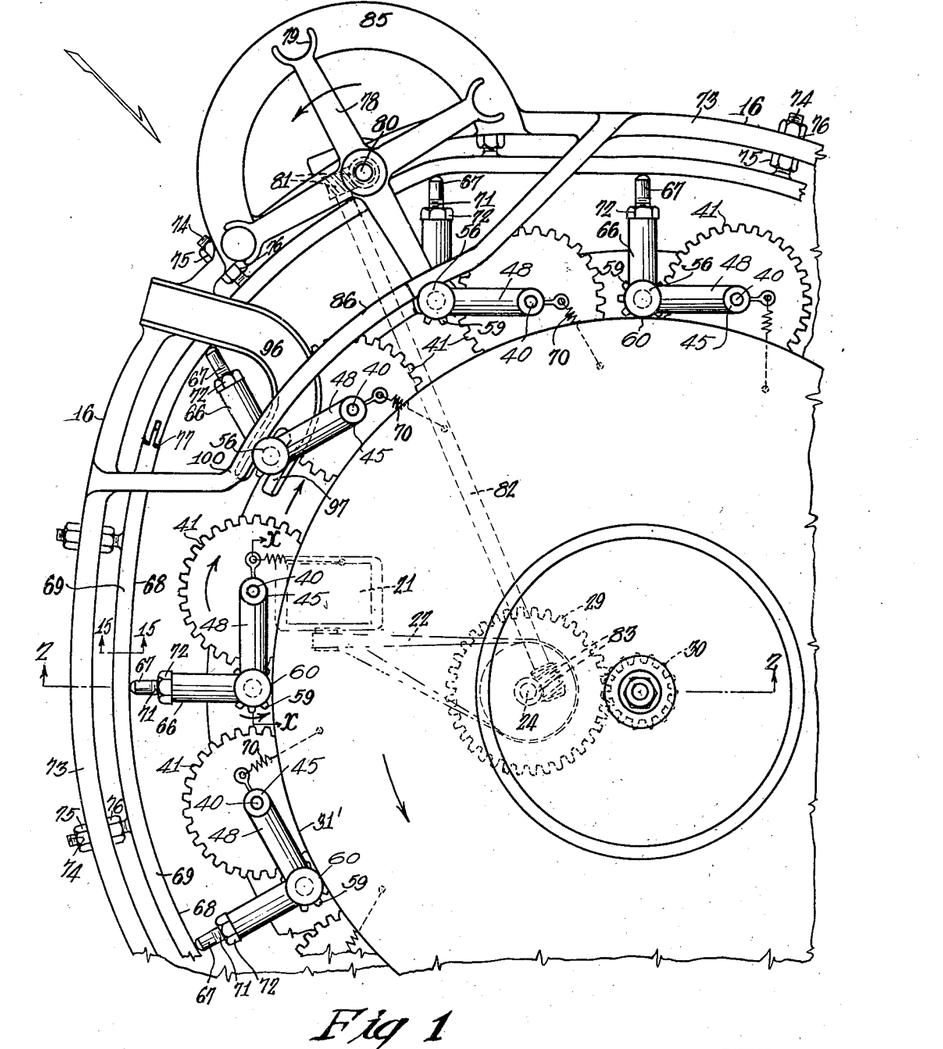
Figure 1 is a fragmentary plan view of one form of my invention.
Figure 2:
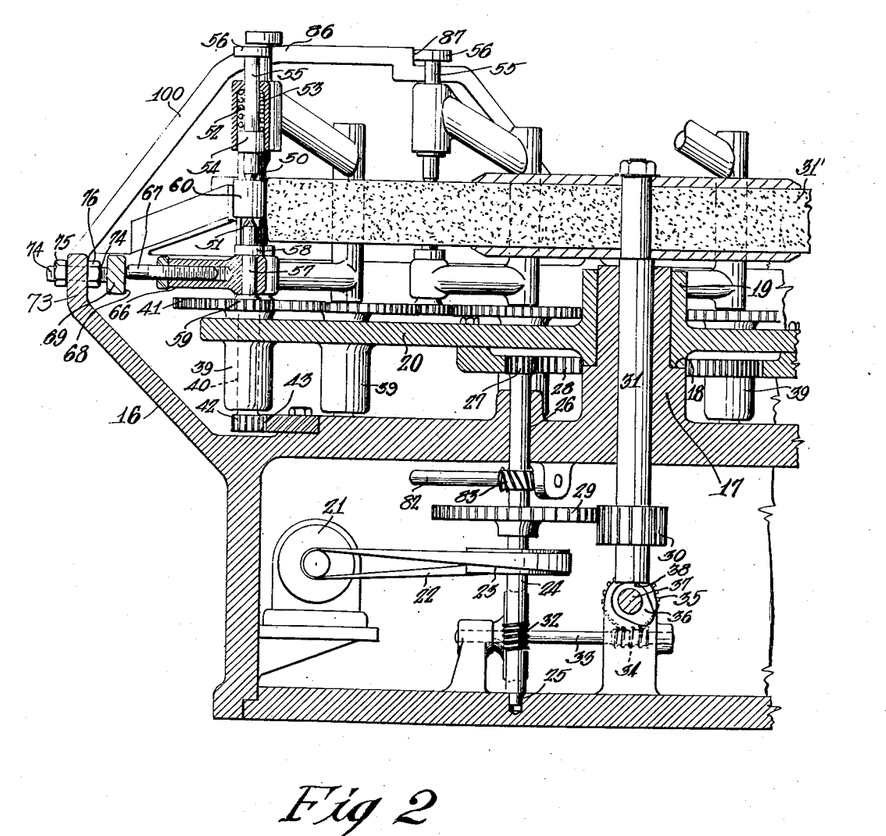
Figure 2 is a fragmentary section taken upon line 2—2 of Figure 1.
Figure 3:
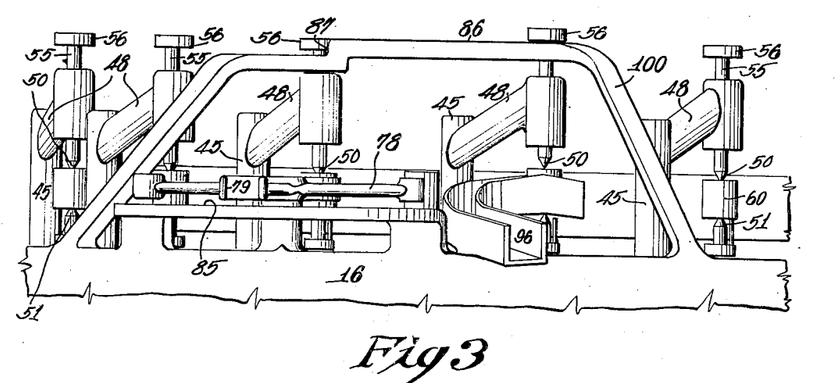
Figure 3 is a fragmentary side elevation of part of the structure shown in Figures 1 and 2.

In Figures 1–3 I show a stationary frame 16 upon which is formed a central vertical bearing 17 shouldered at 18 to receive the hub 19 of a rotatable table 20 upon which table the work is carried in work-holders.

At any convenient point in or upon the frame I mount a motor 21 connected by belt 22 with pulley 23 upon a shaft 24 shown as supported in bearings 25 and 26. The shaft carries a gear 27 which engages with an internal gear 28 rigid with the table to rotate the table.

A gear 29 upon the shaft 24 engages with gear 30 upon a shaft 31 having bearing within the bearing 17 to rotate the shaft and with it to rotate the grinding wheel 31' mounted upon the top of the shaft. This grinding wheel cooperates with all of the work-holders arranged about the table and may operate upon all of the pieces of work therein at the same time, except those at positions of charging and discharging.

In order to protect against grinding too much at the same part of the wheel width the wheel is traversed (reciprocated) axially while it is continuously rotated. This traversing is secured by spiral gearing 32 connecting the shaft 24 with a shaft 33, a worm 34, worm gear 35 and cam 36 upon the shaft 37 of the worm gear, whereby the shaft 31 and the wheel carried by it are lifted and allowed to lower by engagement of the cam 36 with the bottom 38 of the shaft 31. The gear 30 is given sufficient length of tooth to continue in engagement with gear 29 at all times notwithstanding the traversing.

The table 20 is provided at intervals about its circumference with a plurality of bearings 39 within which are supported shafts 40, carrying the gears 41 and 42 respectively above and below the bearings. This construction is shown enlarged in Figures 5 and 6, both of which may be true of Figures 1–3 except as to slight dimensional changes, since the detail by which these figures differ from each other is not shown in Figures 1–3.

Figure 5:
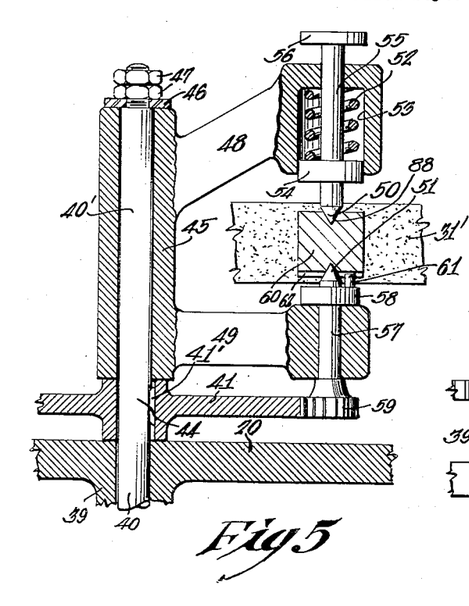
Figures 5, 6, 7 and 8 are enlarged sections taken upon lines corresponding to x—x of Figure 1 and illustrating different work-holding and driving mechanisms.

Gears 41 and 42 are rigidly mounted upon the shaft 40, a key 41' for gear 41 being shown in Figure 5. The gear 43 is coaxial with the turn-table and fastened in any suitable way to the stationary supporting structure.

Figure 6:
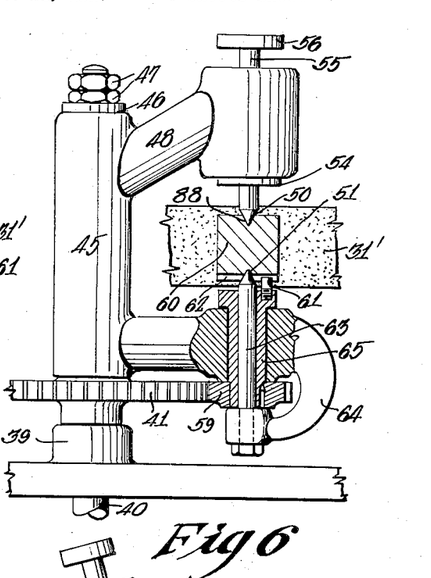

The shaft 40 is extended above the gear 41 to form bearing 44 for the hub 45 of a center chuck which is shown in Figures 2 and 3 held down by gravity only but in Figures 5 and 6 held down upon the shaft by washers 46 and nuts 47.

The sleeve 45 forms a hub for arms 48 and 49 which carry coaxial centers 50 and 51, the upper center 50 being a dead center and the lower center 51 being optionally either live as in Figure 5 or dead as in Figure 6. The dead center 50 is spring-pressed at 52 within a recess 53 where it is centered by a ring 54. This shaft 55 extends through the arm to a head 56.

The live center shaft 57 of Figure 5 has its bearing in the arm 49, resting upon a flange 58 and carrying at its lower end a gear 59 meshing with gear 41. The work 60 is driven by any suitable means such as a pin 61 from the flange 58 extending into a groove 62 of the work.

By this construction the rotation of the table carries the shaft 40 bodily about the axis of the table while rotating the gear 42 upon its own axis. The gear 42 is mounted upon the same shaft as, and therefore carries the gear 41 which in turn rotates the work by rotating the flange 58 carrying the pin 61.

The center chuck is free to swing about the extension 40' of shaft 40, permitting the work to be swung toward or away from the grinding wheel as desired.

The structure of Figure 6 differs from Figure 5 in the particulars only that the lower center is a dead center whose shaft 63 is supported from below by an extension 64 of the arm 49, and that the gear 59 drives a sleeve 65 surrounding the pin 63 instead of driving a live center. The sleeve 65 is supported in the bearing in the same manner as the shaft 57 and carries driving pin 61 which cooperates as in Figure 5 with an engageable part 62 of the work.

Recurring to Figures 1, 2 and 3; at any suitable point at a distance from the shaft extension 40', the arm 49 is provided with a radial or side extension 66 whose terminal 67 engages the inner surface 68 of a feed cam 69 surrounding all or the major portion of the path or orbit of movement traveled by the work-holders and work and this cam may be used as in Figures 1, 2 and 3 to determine the distance of the work from the center of the grinding wheel, pushing the work in toward the center to effect the grinding and allowing the work to move outwardly for removal when the grinding has been completed.

With the direction of grinding wheel movement given by the arrow in Figure 1, the pressure of the grinding wheel against the work as well as the pressure of the teeth of wheel 41 against the teeth of wheel 59 will tend to throw the wheel 59 outwardly from the center of the wheel, maintaining the terminal 67 in engagement with the cam. For additional assurance of this tendency of the work to move outwardly toward the cam I show a tension spring 70 pulling upon the arm at the opposite side of the center of shaft 40 with respect to the work.

The terminal 67 is shown as capable of adjustment by threading into the extension 66 as at 71 by nuts 72.

The cam 69 is shown conventionally as supported from a frame rim 73 by studs 74 which pass through the rim and are adjustably held to place adjustably by nuts 75 and 76. The studs are rigidly fastened to the rim and thread through the cam. The cam is shown as sectioned at 77 at a point beyond that at which grinding is completed to permit the slight variation of length incident to adjustments in the radial position of the cam and to permit making it up in several parts.

In practice the cam need not extend all the way around or the joint may be an ordinary lap joint.

Automatic feeding of the work to the machine is provided by rotor arms 78 terminating in spring clamps 79.

The rotor member is mounted upon a shaft 80 that is driven through spiral gears 81, shaft 82 and spiral gears 83, one of which is mounted on the shaft 24.

A semicircular gauge 85 below the circular path of the clamps 79 is used to exactly register the work pieces vertically in the clamps. The work pieces are put in to the rotating clamps by hand and exactly positioned vertically by pushing down to the gauge 85.

The travel of the feed clamps is synchronized with that of the work-holders upon the turn-table, successive work pieces being presented by the successive clamps to position between the centers 50 and 51 in the successive work-holders as these centers successively reach the loading position.

When this position is reached the axis of the work piece in the clamp lies momentarily in line with the common axis of the upper and lower centers, the upper center having been raised some time before by reason of the bottom of the flange 56 riding along the upper surface of the cam 86. The work piece is at a higher level than is the dead center.

At charging position the flange 56 comes to an abrupt drop 87 on the cam 86 and as a result the upper center 50 springs downwardly under the action of the spring 52, the point of the center entering the centering recess 88 in the top of the work piece 60 and pushing the work piece downwardly out of the clamp and into centering engagement with the lower center 51.

As the work progresses along the cycle of operations from the point of loading it is inwardly pressed against the grinding wheel at the same time that it is rotated and is carried bodily about the axis of the wheel. The inward feed depends upon the setting of cam and the setting of the terminals 67; both of which are preliminarily designed to suit the work and are capable of adjustment.

Figure 4:
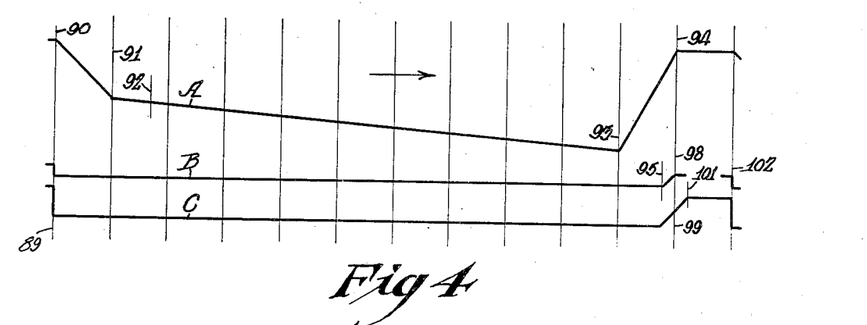
Figure 4 is a diagrammatic view to illustrate the relative positions of certain parts throughout the cycle of operations.

The cycle of operations is shown diagrammatically in the hypothetical curves A, B and C of Figure 4.

In these curves the abscissæ represent the angular or circumferential position around the machine or, putting it differently, represent successive positions along the common circumferential orbit of the work pieces. The abscissa of any point of any of these curves corresponds to a definite angular position about the axis of the machine. The ordinates in curve A represent the distances of the inner surface of the feed cam from the outer surface of the grinding wheel, and the ordinates of the curves B and C represent, respectively, the elevation of the work piece 60 and the elevation of the upper dead center 50.

The cycle of operations is illustrated upon a single unit and takes place during each circuit of the machine.

At the line 89 the work piece 60, which has just been positioned between the centers 50 and 51 by one of the feed clamps, is engaged by the released dead center 50. The flange or head 56 upon the top of the stem 55 of the dead center has been riding along the cam track 86 to hold the dead center in raised position. At the line 89 of the curves B and C the cam head reaches the abrupt drop 87 Figure 2 in the cam and the spring 52 forces the center downward into the center of the work piece and drives the work piece downwardly from between the clamping jaws 79 on to the lower center 51.

The work piece is shown with an offset longitudinally directed projection by which driving is effected. Here its function is performed by a wall of a diametral groove 62. The pin 61 in the upper side of the revolving flange 58 in rotating about the axis of the shaft 57, quickly finds the groove, after which the work rotates with the driving member 58.

The feed cam is, at this time, relatively far from the grinding surface of the wheel so that the work piece is positioned well away from the wheel. Between the lines 90 and 91 the feed cam is formed to bring the work rapidly toward the wheel.

There is some variation in the initial sizes of the work pieces, and therefore some variation in the position represented by the line 92 (Figure 4) at which the work engages the wheel. Normal feed begins at the line 91 and the engagement at the line 92 between the work piece and the wheel will be variant with the different work pieces according to the slight variation in the sizes of the work pieces.

Between the lines 91 and 93 the inner surface of the fixed feed cam is located progressively nearer to the grinding surface of the wheel and the grinding operation all takes place in that part of the orbit which is between these lines. At the line 93 the feed is over and the feed cam begins to offset from the surface of the wheel. This offsetting of the feed cam is indicated as being complete by the time the line 94 is reached. At the line 95, which is somewhat after the completion of the feeding operation the work-holder brings the work piece into a guideway 96 (Figure 1) which is forked at its end 97 to pass the center 51 and pin 61 (Figure 5).

The bottom of the work piece is engaged by the upwardly sloping guideway upon opposite sides near its outer circumference. As the table rotates the work piece is forced to slide up the forked guideway, which lifts the work piece to clear the lower center 51 and the drive pin 61. During the lifting of the work piece by the forked guideway the dead center 50 lifts against the action of the spring 52. The lifting of the work piece is complete at the line 98 where the upward slope of the forked guideway ends.

At some line 99, which is desirably substantially coincident with the line 98, the bottom of the head or flange 56 upon the top of the stem 55, carrying the dead center, engages the upper surface of an upwardly sloping portion 100 of the cam 86. Between the lines 99 and 101 the head rides up the inclined surface of this cam, raising the upper center from its engagement with the work piece and thus leaving the work piece in the guideway 96 along which it is pushed by succeeding work pieces.

At the line 102, which is coincident with the line 90, the cycle begins again, a new work piece being inserted into proper position between the upper and lower centers and the upper center snapping down under the action of the spring as the head reaches the drop 87 of the cam 86.

In the structure shown in Figures 1 to 6 the work pieces are chucked between the centers.

It will be understood that the character of chucking depends largely on the form of the work piece, and where the work is tubular it may be conveniently held upon mandrels rather than between centers. I illustrate this in Figure 7 by a structure for holding the work pieces upon mandrels.

Figure 7:
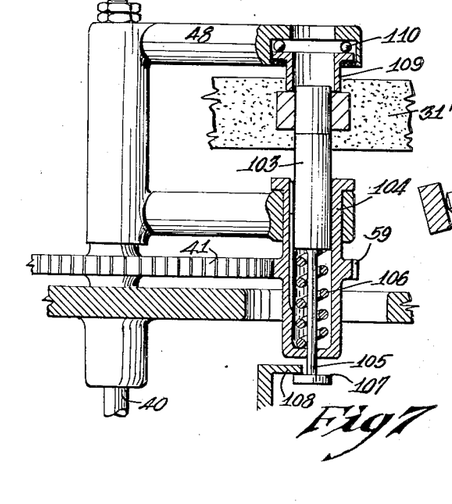

The mandrel 103 has a splined mount in the sleeve 104, being adapted to slide longitudinally in the sleeve but not to rotate with respect to the sleeve. The sleeve 104 may be driven like the sleeve 65 of Figure 6, the pinion 59 carried by the sleeve meshing with the gear 41 keyed to the shaft 40.

The mandrel carries a downwardly extending stem 105 which is surrounded within the sleeve by a spiral spring 106 that spring-presses the mandrel upwardly. At its lower end the stem is provided with a flange or head 107 which is adapted to engage an arcuate cam 108 upon the stationary frame structure of the machine.

Figure 7 shows the mandrel in operating position. Its upper end is suitably tapered to more easily register with the interior of the work piece.

The work piece upon its upper side engages the lower end of a rotatable sleeve 109 which is provided with a thrust bearing 110 in the arm 48. The sleeve 109 functions as a stop that in cooperation with the upwardly pressing mandrel maintains the work piece at the right height for grinding.

When the grinding operation is completed, the mandrel is pulled downwardly by an engagement between the upper surface of the head 107 and the lower surface of the cam 108, which leaves the work piece in position to be removed in any suitable way.

The new piece is inserted automatically, or by hand, to a position axially above the mandrel which is then permitted to move upwardly under the action of the spring 106, the cam being suitably relieved (preferably abruptly) to permit this. The mandrel moves up into the interior of the work piece and lifts the work piece to the position shown in Figure 7.

Figure 8:
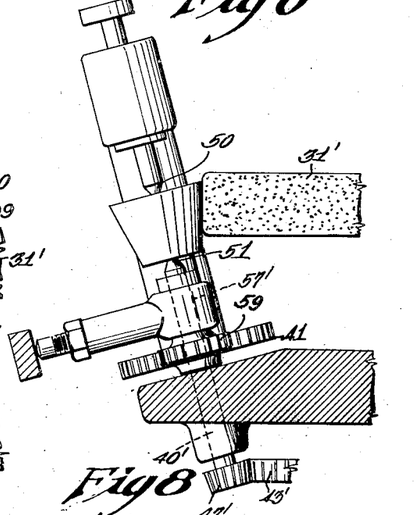

Figure 8 illustrates my invention applied to taper external grinding. Here the arrangement is that of Figure 2 except that the common axis of the upper and lower centers 50 and 51 is inclined to the requisite angle for the taper, the inclination being angularly equal to the taper of one side with respect to the axis. The driving gears 42' of the individual work-holder units are correspondingly somewhat inclined toward stationary gear 43' so that the meshing teeth on these two gears are somewhat tapered.

In Figures 1 to 6 the mechanism for feeding the work to the wheel is a feed cam 69 which is located progressively nearer to the axis of the table along the grinding portion of the orbit in the direction of travel of the table.

Figures 9, 10, 16:
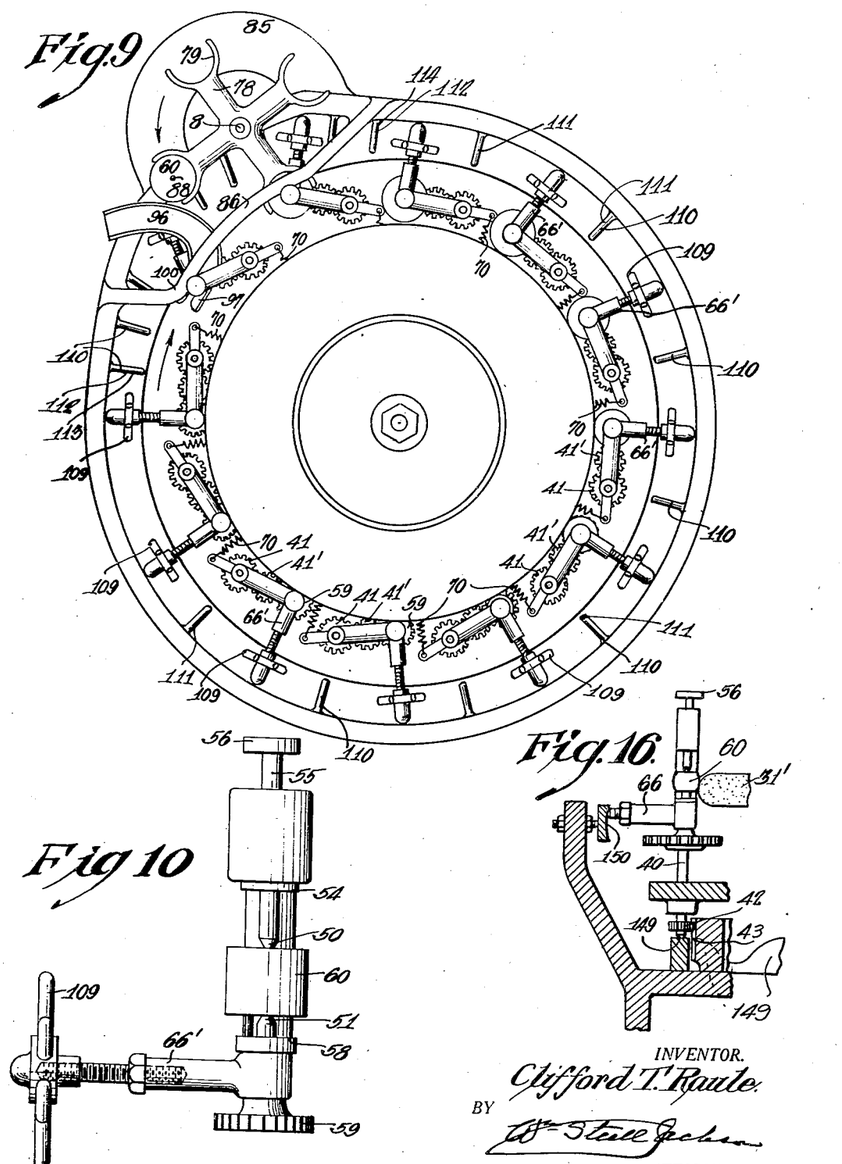
Figure 9 is a top plan view corresponding generally to Figure 1 but showing a different form of feed between the work and wheel.
Figure 10 is a fragmentary side elevation of one of the work-holding and feeding units shown in Figure 9.
Figure 16 is a fragmentary diagrammatic view illustrating an adaptation of the invention to external curved grinding.

In Figure 9 I illustrate a structure in which the cam is concentric with the axis of the turn-table throughout the feed portion and the feed is effected by means of star wheels 109, one for each work-holder mounted upon the radially extending arms 66' of the work-holders.

Each radially extending arm is successively slightly lengthened by the engagement between its star wheel 109 and successive projections 110 spaced around the circular cam 68' on the stationary supporting structure 16. Each engagement gives a small radial screw adjustment to the effective length of the arm.

There are two sets of these stationary projections 110 that are respectively placed to engage opposite sides of the star wheels. If one set of projections 111 which feed the work by successive small steps into the wheel are considered as engaging the upper sides of the star wheel, then the other set 112 that are relatively closer together will successively engage the lower sides of the star wheels to return the work-holder to its initial position for the next cycle. The projections 112 which effect screw return of the work-holder and which engage the lower side of the star wheels, where the projections 111 engage the upper side, are placed between the position at which finish grinding is completed upon an old piece and that at which it begins upon a new piece.

The return of the work-holder to its initial position will take place between the lines 95 and 90 of Figure 4, that is in the portion of the orbit between withdrawal of the work from the wheel after finish grinding and the entry of the work piece for the next cycle. In accord with this the projection 113 (being the first of the set for returning the work-holder) is placed just after the position at which the finished work piece is withdrawn and the last projection 114 of this set is placed at or before the position at which the next work piece enters the holder.

The first of the forwardly feeding projections 111 should preferably be placed just after the work piece has been properly positioned in the work-holder and the last of the forwardly feeding projections may be located at some little angular distance before the end of the grinding operation.

The portion of the orbit taken up by the return projections is shown exaggerated in Figure 9. In practice the return should usually be completed by the time a new piece enters the work-holder, requiring considerable concentration of these star-wheel operating devices within a short angular distance.

The insertion of an idler 41' between the gears 41 and 59 permits the use of smaller gears or gives a greater length to the arms 48 and 49 carrying the work pieces. Unless two idlers be used it will also reverse the direction of rotation of the work piece, which when objectionable, can be corrected by reversing the direction of rotation of the wheel 41.

Figure 11:
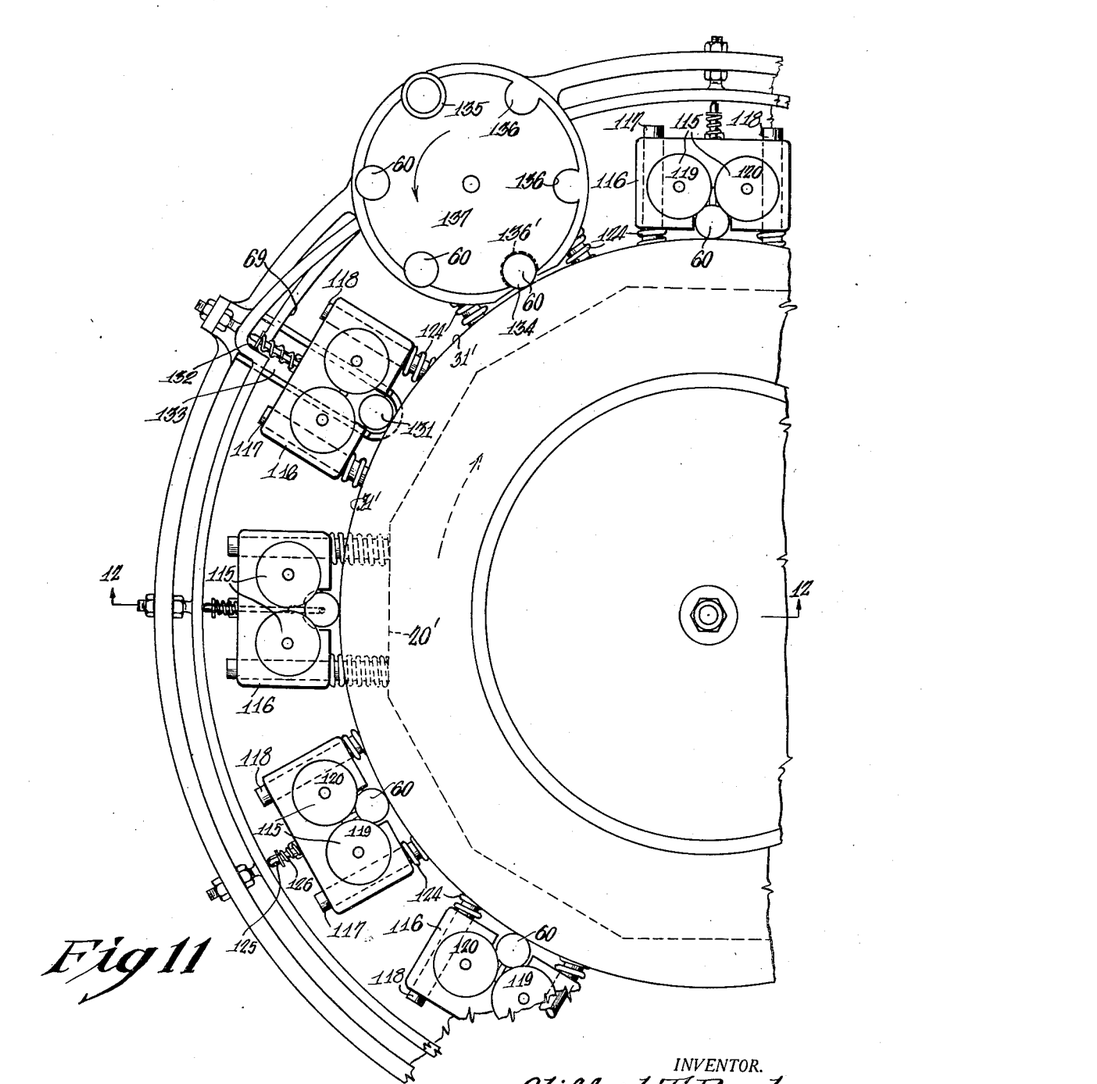
Figure 11 is a fragmentary top plan view showing my invention adapted to centerless grinding.
Figure 12:
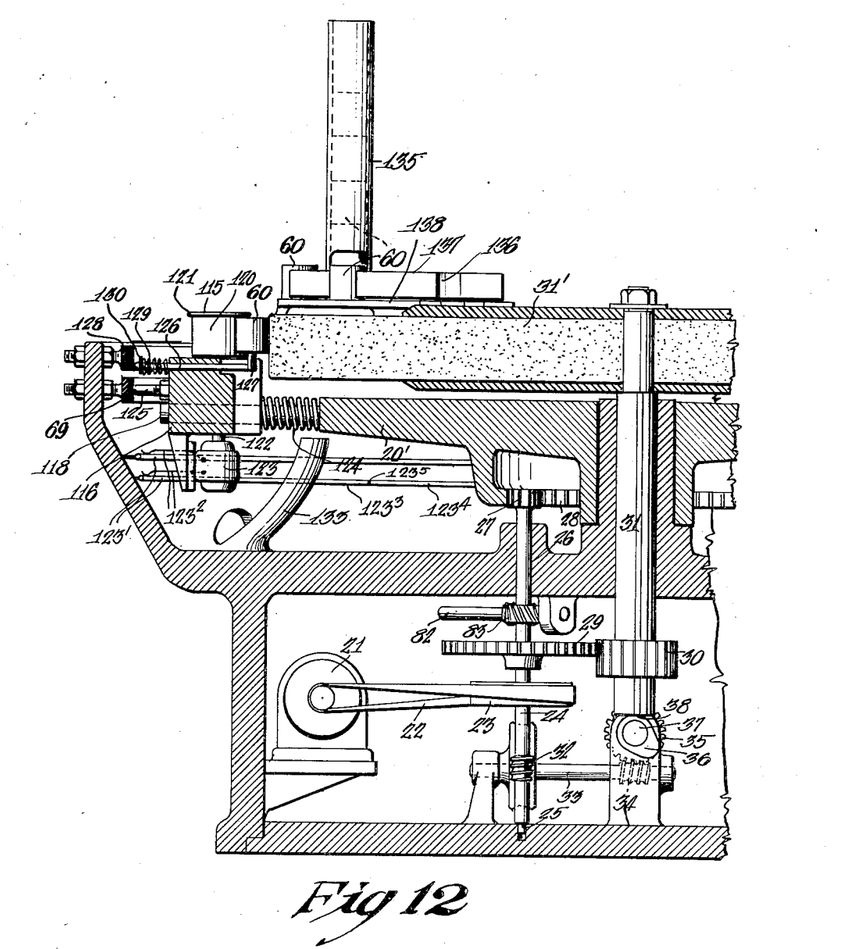
Figure 12 is a fragmentary section taken upon line 12—12 of Figure 11.

My invention is well adapted to centerless chucking and I illustrate this in the structure shown in Figures 11 to 12.

In the structure shown in these figures the drive and traverse of the wheel and the drive of the turn-table and the mechanism for supplying the work pieces automatically are as already illustrated in Figure 2 and therefore do not need description again. Corresponding parts of Figure 12 are numbered as in Figure 2.

The work-holders 115 spaced around the turn-table 20' are mounted upon radially slidable carriers 116. Each carrier is adapted to movement radially of the turn-table along parallel and horizontally spaced slideway rods 117 and 118 so supported as to extend horizontally outwardly from the turn-table. The work 60 is pressed against the grinding wheel 31' by rollers 119 and 120, being supported on the outside by the rollers and on the inside by the wheel. The rollers are preferably flanged upon the upper end at 121.

One of these rollers drives the work piece and is shown as direct-connected to the shaft 122 of a motor 123 which is desirably adapted to operate at different speeds. The other roller is an idler that turns by means of engagement with the work piece.

Stationary electric busses 123' feed the motor, trolleys $123^2$ from the motor sliding along the busses, any desired change in motor speed being effected by making one of the busses in relatively insulated sections under different voltages, as for example sections $123^3$ and $124^4$ relatively insulated at $123^5$.

A spiral spring 124 is placed upon each of the rods 117 and 118. These springs surround the rods between the outer periphery of the turn-table and the inner face of the carrier 116 supporting the work-holder rollers and resiliently press the carrier outwardly.

Each work-holder carries a longitudinally adjustable arm 125 midway between the slideway rods 117 and 118 but extending radially outward to engage the inner surface of the feed cam 69. This arm adjustably screws into the body of the carrier.

Vertically above the arm 125 I show a radial slidable stem 126 which is bent upwardly at its inner end 127 to present a removable support to the bottom of the work piece. The stem 126 extends radially outward to engage a suitable circumferential cam 128 which may or may not form part of the feed cam. It is spring-pressed outwardly by a spring 129 that is compressed between the outer face of the carrier 116 and the inner face of a flange 130 upon the stem. Outward motion is prevented by the engagement of the outer end of the stem with the inner face of the cam 128.

During grinding each work piece is maintained from moving downwardly by the removable support 127 and is prevented from moving upwardly under the traversing action of the wheel by the projecting rims 121 upon the upper end of the rollers.

The supporting member 127 is positioned by the cam 128 in cooperation with the spring 129. When the unloading position is reached at 131 of Figure 11 the support 127 moves away, radially outwardly under the action of the spring by reason of a suitable outward offset 132 (preferably an abrupt offset) in the cam 128. The feed cam 69 is also here somewhat relieved radially outwardly so that when the unloading position is reached the support 127 snaps away and the work piece drops to an inclined chute 133 which discharges into any suitable receptacle, not shown.

By the time the loading position is reached at 134, Figure 11, the support 127 has been moved back to support the work piece of the next cycle. At this time the work-holder is still positioned radially out from the grinding wheel a sufficient distance to permit the new work piece to drop to place (past the rims 121 of the rollers) upon the support 127.

The work pieces are fed by gravity from a supply tube 135 into successive holes 136 that are uniformly spaced around a rotor disc 137 and that are adapted to successively register with the bore of the supply tube.

The bottom work piece in the supply tube drops into a hole of the disc as soon as the rotation of the disc brings the hole into registry with the bore of the supply tube. A stationary supporting plate 138 beneath the rotating disc and perforated at the loading position keeps the work piece from dropping through the disc until it has been swept around by the disc to the loading position, at which point the hole registers with the perforation 136' of the supporting plate and the work piece drops through, between the rollers 117 and 118 on the outside and the grinding wheel on the inside, upon the support 127.

The operation of the disc is synchronized with the motion of the turn-table to bring the holes successively into position to deliver the successive work piece to the successive work-holders as these holders reach loading position, the driving connections being the same as for the rotor loading member 78 of Figures 1 and 2, already described.

Figure 13:
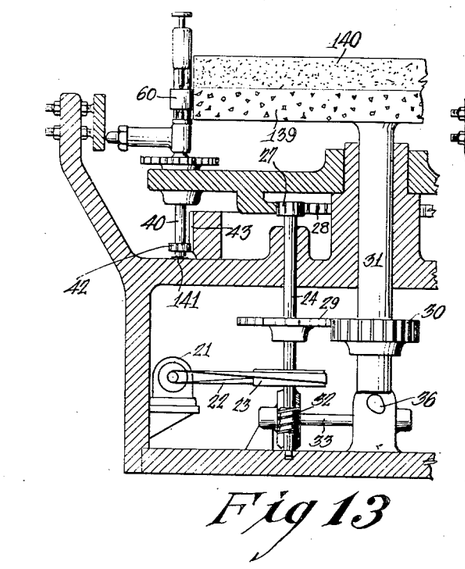
Figures 13 and 14 are fragmentary vertical central sections showing my invention adapted to using different grinding wheels at different portions of the grinding cycle.
Figure 14:
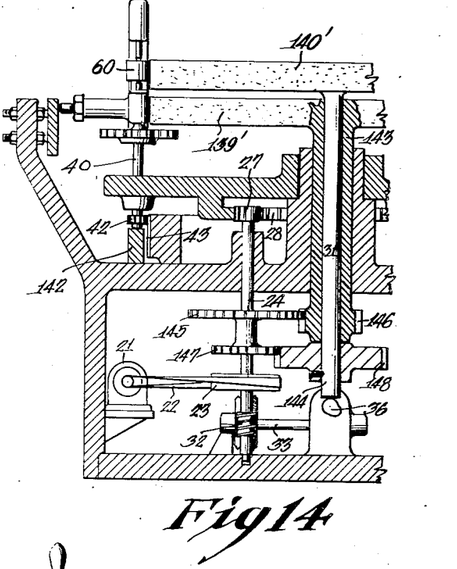

It is sometimes advantageous to apply different wheels to the same work pieces at different parts of their orbit, as for example a different wheel during finishing than during the rough cutting, and I show structure adapted to do this in Figures 13 and 14.

In Figure 13 the wheels are relatively rigid and turn as one, the composite wheel comprising a coarse wheel 139 for rough cutting and a finer wheel 140 for finish grinding.

The composite wheel unit is driven and traversed, as shown in Figure 2, and the work-holders are also driven as in the structure of Figure 2, with the exception that the stationary gear 43 has long teeth, and that the work-holders are adapted to operate at different elevations, being positioned vertically by a stationary arcuate cam 141 adapted to engage the bottom of the shaft 40.

The offset wheel is vertically traversed by the rotating cam 36 and the work-holders are positioned by means of the arcuate upwardly directed cam 141—142.

During the rough cutting the work-holder operates in its lower position and the work 60 is presented against the surface of the roughing wheel 139. After the roughing is completed the work-holder is automatically raised by an upwardly sloping portion of the cam 141, not shown in Figure 13, but seen at 142 in Figure 14, bringing the work into position for grinding upon the surface of the finishing wheel 140.

In the structure shown in Figure 14 the wheels are separate and revolve at different speeds, the upper and finishing wheel 140' turning at a much lower speed than the lower and roughing wheel 139'.

The shaft 143 of the roughing wheel is hollow to concentrically surround the shaft 144 of the finishing wheel. These outer and inner shafts are driven at different speeds by different gearing driven by the shaft 24. The large gear 145 upon shaft 24 meshes with a pinion 146 on the shaft 143 and a pinion gear 147 upon shaft 24 meshes with the relatively large gear 148 upon shaft 144. The hollow shaft of the roughing wheel has end bearing support upon the upper side of the gear 148.

The wheels are traversed simultaneously, the inner shaft being turned as in the structure of Figure 13, and the outer shaft rising and falling with the rise and fall of the inner shaft.

During rough cutting, the work 60 is presented to the grinding surface of the wheel 139' which is revolving at normal cutting speed. After rough cutting is completed the work-holder is raised by the cam 142 to the position shown in Figure 14, in which the work is presented to the much more slowly revolving finishing wheel 140', which may be of the same coarseness as the cutting wheel or of different, preferably finer grain.

While curved external grinding has thus far not been usual, in practice my invention is adapted to curved external grinding, the only requisites being that of making the effective line of traverse accord with the desired curve and suitably curving the surface of the grinding wheel. The curvature of the wheel is preferably similar but of slightly greater curvature if concave, or less curvature if convex, than the desired curve.

The curved traverse is more easily accomplished by traversing the work-holder rather than the wheel, in that the wheel has to simultaneously engage a number of work pieces. I am well aware that many arrangements may be used to obtain a curved traverse, the particular arrangement that is preferably depending upon particular conditions to be met, and of these I illustrate one in Figure 16.

The structure shown in Figure 16 is very similar to those of Figures 2 and 13, with the exception that the wheel traverse mechanism is omitted and the work is traversed vertically by means of an undulating arcuate cam 149 engaging the bottom of the shaft 40, and traversed horizontally by a vertically curving surface 150 upon the feed cam to give the required traverse to the work. Evidently any desired curve of traverse may be obtained by suitably forming the cooperating cam surfaces 149 and 150.

The grinding wheel 31 has to be periodically trued up by traversing a diamond across its face. The wheel being large however, as compared to the work pieces, the truing operations are far apart, as once or twice a day.

The wheel revolves at its normal cutting speed while it is trued up, but the turn-table should not revolve during the truing of the wheel as the work-holders would then strike the diamonding mechanism. In Figure 2 a hand-operated clutch (not shown) between the gear 27 driving the turn-table and the shaft 24 which drives both the gear 27 and the grinding wheel. When this clutch is thrown the turn-table stops but the wheel continues to rotate.

Figure 15:
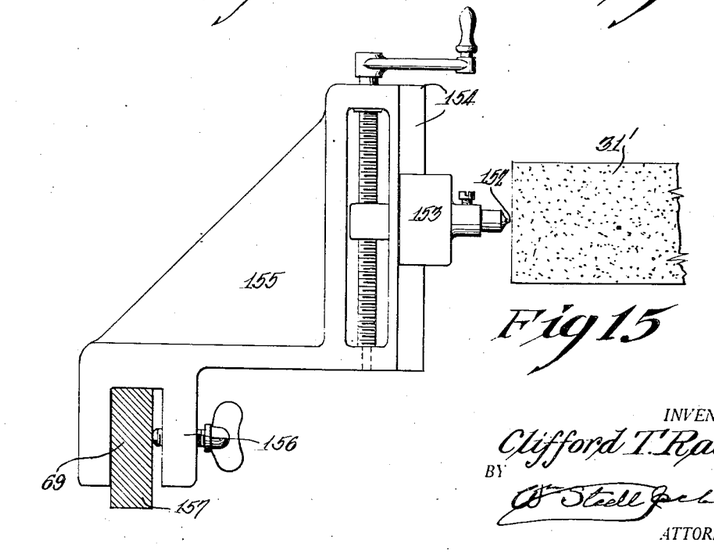
Figure 15 is a vertical section corresponding generally to 15—15 of Figure 1 showing a diamonding attachment.

Figure 15 shows a diamond 152 mounted in a holder 153 that is adapted to hand-screw vertical traverse along a slideway 154. The slideway forms part of a bracket 155 that is removably clamped at 156 to a stationary portion 157 of the machine. Preferably the bracket of the diamond should be mounted upon the feed cam at or very near to the position at which the cam is most near to the wheel, so that the point of attachment to the machine is preferably upon the feed cam at the position corresponding to finish grinding.

The feed cam needs to be periodically adjusted to accommodate wearing away of the wheel and reduction in size of the wheel from diamonding, and during each truing I support the bracket of the diamond upon that part of the feed cam which determines the finish size of the work piece, which is that nearest to the wheel. When this is done adjustments around the feed cam preparatory to diamonding need not be extremely close in that they will not affect the size of finish grinding.

Having thus described my invention, what I claim as new and desire to secure by Letters Patent is:—

1. In an external grinder, a grinding wheel, a turntable movable about the axis of the wheel, a plurality of independent duplicate rotating work-holders spaced about the table, positive feeding mechanism common to all of the work-holders progressively moving them toward the wheel as they progress about it and means for relatively traversing the work-holders and wheel during the grinding operation.

2. In an automatic external grinder, a grinding wheel, an endless carrier movable around the wheel and work supporting and inwardly adjustable feeding devices concurrently rotatably supporting and progressively and positively feeding a plurality of pieces of work into the wheel during a portion of each circuit thereof, and having an adjustment to compensate for the wearing away of the wheel.

3. In an external grinder, a grinding wheel, a turntable adapted to move about the axis of the wheel, a plurality of duplicate work-holders, mounts for the work-holders providing movement of the work-holders toward and away from the wheel, positive feeding mechanism common to all of the work-holders and progressively feeding each work-holder to the same extent at the same angular position about the axis of the wheel, and traversing mechanism for relatively axially moving the work-holders and the wheel.

4. In an external grinder, a grinding wheel, a plurality of work-holders adapted to travel around the wheel, a positive guide for the work-holders successively feeding them progressively into the wheel along a portion of their travel and having an adjustment for changing the path of the work-holders to compensate for wearing away of the wheel, and mechanism releasing the work-holders successively in a subsequent portion of the orbit.

5. In an external grinder, a central grinding wheel, planetary work-holders adjustable with respect to the wheel and adapted to press work pieces to the wheel progressively and positively along the same portion of their orbit and common means for controlling the operation of the work-holders.

6. In an external grinder, a central wheel, planetary work-holders having a common orbit around the wheel and presenting work pieces thereto in combination with mechanism effecting a relative traverse motion between the work-holders and wheel, a cam surrounding the orbit to guide the work-holders progressively inwardly toward the wheel and means for adjusting the distance between the cam and the wheel to compensate for wear of the wheel.

7. In a multiple external grinder, a grinding wheel, planetary work-holders, guiding means adapted to guide the holders progressively along a common orbit around the wheel, and an adjustment of the guiding means adapting it to change the common orbit of the holders in order to accommodate wearing away of the wheel.

8. In a multiple external grinder, a central wheel, planetary work-holders pivoted off center and each adapted to present a work-piece to the wheel, a feed cam around a portion of the orbit and adapted to positively and progressively feed the work-holders toward the wheel, and an adjustment of the cam for changing the orbit to accommodate wearing away of the wheel.

9. In an external grinder, a grinding wheel, a turntable mounted to turn about the axis of the wheel, a plurality of pivots mounted in said table, arms connected with the pivots, opposing coaxial centers carried by the arms adapted to swing upon the pivots toward and from the wheel, cam feeding mechanism distributed about the wheel common to all of the centers, adapted to progressively move the arms toward the wheel to the same extent at the same point in their progress about the wheel.

10. In an external grinder, supporting structure, a grinding wheel adapted to rotate at grinding speed, a turntable coaxial therewith, bearings circumferentially spaced around the table outside of the circumference of the wheel, a spindle journaled in each bearing, work-holders mounted to swing bodily about the respective axes of the spindles for a short distance substantially radial of the wheel, a feed cam mounted on the supporting structure radially adjustable with respect to the wheel and engaging the work-holders to move them toward the wheel and an adjustable connection between the work-holders and the cam making engagement with the inner surface of the cam.

11. In an external grinder, a grinding wheel, a turntable coaxial therewith, work supports pivoted off center and circumferentially spaced around the table adapted to be moved into and away from the wheel, a pair of coaxial cooperating centers mounted upon each work support and adapted to center and support a work piece and to present the work piece to the wheel, a stationary feed cam extending part way around the table and adjustably spaced therefrom, a stiff connection mounted on each work support and adapted to slide along the cam, and resilient means pressing each work support away from the wheel.

12. In an external grinder, a grinding wheel, a work table coaxial therewith, work-holders pivoted off center and circumferentially spaced around and mounted upon the table adapted to move the work piece into and away from the wheel, a stationary feed cam extending circumferentially of the table and adjustable with respect to the table, a guide on each work-holder adapted to move along the feed cam and means pressing the work-holder to move the work away from the wheel.

13. In an external grinder, a grinding wheel, centered chucks spaced about and continuously moving along a common orbit around the wheel each comprising a lower center, an upper center pressed downwardly, and work-driving means rotating bodily around the axis of the centers, an arcuate cam having an upwardly sloping portion adapted to engage a cooperating portion of the upper center to raise the upper center to loosen the chuck and having subsequently an abrupt downward offset for chucking the next piece and means for inserting a work piece between the centers while the upper center is raised and synchronized with the drop of the upper center.

14. In an external grinder, a grinding wheel, centered chucks spaced along a common orbit around the wheel and each comprising a lower center, an upper center coaxial therewith and means rotating coaxially with the lower center for driving the work of the chuck, an upwardly sloping fork in the orbit to engage the bottom of the successive work pieces upon opposite sides to raise the work from the lower center, in combination with mechanism for lifting the upper center away from the work after the work has been raised.

15. In an external grinder, a common grinding wheel, an endless carrier adapted to move around the wheel, a plurality of bearings spaced along the carrier at definite points thereof, a center support and connections adapted to swing bodily about each bearing, cooperating coaxial centers in each support, means for rotating work placed between the centers, feed mechanism common to all of the sets of centers progressively feeding them toward the wheel along a portion of each circuit thereof and common means along the path of the centers engaging one of the centers, moving it away from the other, to release a finished work piece from the centers.

16. In an external grinder, a grinding wheel, centered chucks spaced along a common orbit around the wheel, and each comprising a lower center and an upper center coaxial therewith, means rotating coaxially with the lower center for driving the work of the chuck, and an upwardly sloping fork adapted to engage the bottom of the work upon opposite sides of said means to raise the work from the lower center.

17. In an external grinder, supporting structure, a grinding wheel mounted upon a shaft, a turntable concentric with the shaft and adapted to turn with respect thereto, mechanism for driving the table and wheel at different speeds, bearings spaced around the turntable at definite points thereof, a spindle in each bearing, a pinion on each spindle, a stationary gear meshing with the pinions and concentric with the shaft, work-holders mounted to pivotally swing bodily, one upon each spindle as a pivot in a direction to move the work in the holder to and from the wheel, gearing between the spindle and the work-holder for driving the work, an external cam engaging all of the work-holders to progressively feed them toward the wheel.

18. In a multiple external grinder, a central wheel, a second wheel coaxial therewith, planetary work-holders adapted to travel around the wheels along a common orbit and mechanism for guiding the work-holders to present the work to one of the wheels during one portion of the orbit and to the other of the wheels during another portion thereof.

19. In a multiple external grinder, a central wheel, planetary work-holders travelling around the wheel, a stationary guide around the major portion of the orbit and individually adjustable stiff connections between the guide and the respective work-holders adapting the grinder to grind to different definite sizes simultaneously.

20. In a multiple external grinder, a central grinding wheel, planetary work-holders each adapted to present a work piece to the wheel, a feed cam adjustably mounted along the grinding portion of the orbit of the wheel, and a diamond carrier mounted upon the feed cam.

21. In the art of externally grinding a plurality of pieces, a pair of concentric grinding wheels, means for rotating the wheels at different speed, a plurality of work-holders, means for driving the work-holders, means for causing the work-holders to follow the path about the wheels and means for causing the work-holders to traverse the work successively over the wheel of faster speed at earlier part of the grinding operation and the other wheel during the latter part of the operation.

CLIFFORD T. RAULE.